United States Patent Office 2,755,621
Patented July 24, 1956

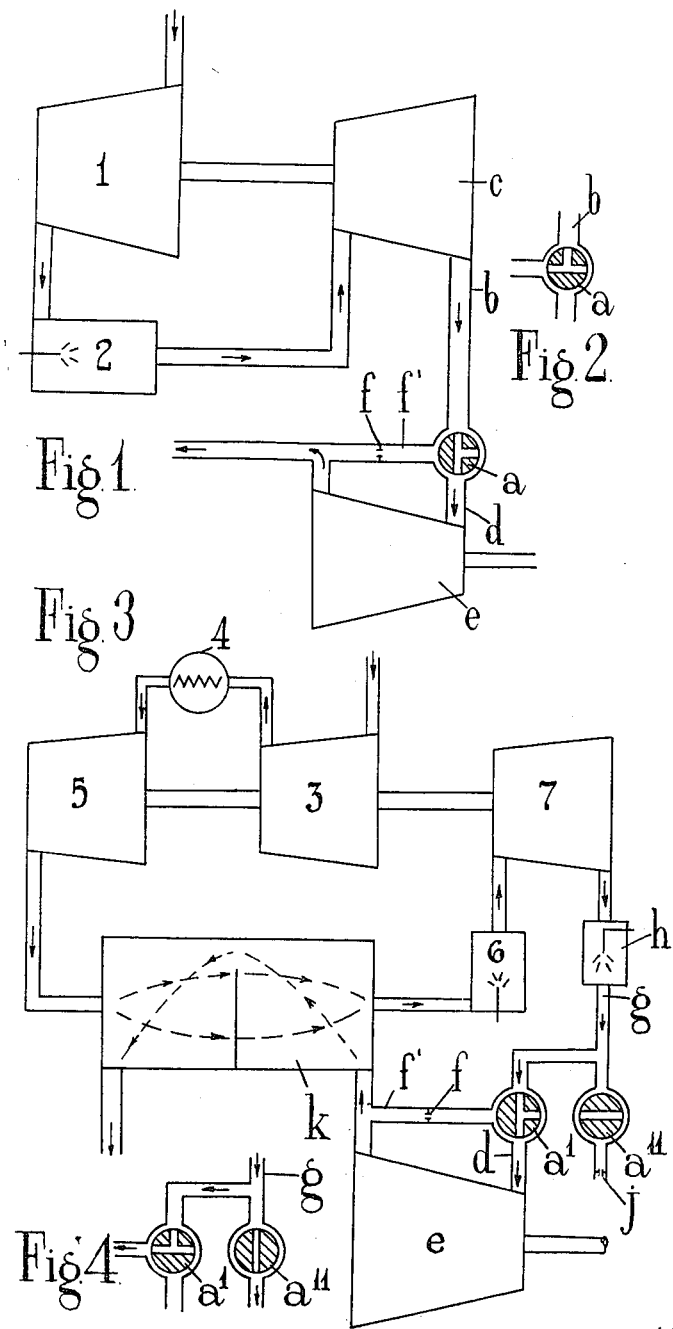

2,755,621

GAS TURBINE INSTALLATIONS WITH OUTPUT TURBINE BY-PASS MATCHING THE OUTPUT TURBINE PRESSURE DROP

Basil Joseph Terrell, Monkseaton, England, assignor to The Parsons and Marine Engineering Turbine Research and Development Association, Wallsend-on-Tyne, England Application April 5, 1952, Serial No. 280,700

Claims priority, application Great Britain July 4, 1951

4 Claims. (Cl. 60—39.16)

This invention relates to gas turbine installations of the kind in which the cycle includes a separate output turbine, such installations being particularly suitable for marine propulsion or for other automotive applications where rapid maneuvering is necessary or desirable.

In such installations it has been customary to provide a controllable by-pass round the separate output turbine so arranged that when the by-pass is open the gas flows round the turbine instead of through it and the turbine ceases to produce power. An effect of this by-pass, however, is to reduce the pressure drop across the turbine and this will naturally influence the remainder of the cycle (that is, the gas generator portion) necessitating adjustments in fuel supply to the compressor turbine or turbines with consequent rapid temperature variations.

The object of the present invention is to obviate the above drawback of existing installations, and the invention consists in a gas turbine installation of the kind referred to comprising a change-over valve so connected that with the change-over valve in one position the gas flows through the output turbine in the normal manner while with the valve in the other position the gas is cut off from the turbine and flows through an orifice of such a size as to produce the same pressure drop as that produced across the turbine under the same conditions of mass flow and inlet temperature.

In its application to an installation in which the output turbine discharges into a heat exchanger the invention also consists in using in conjunction with the change-over valve two orifices in parallel so connected that the discharge from one orifice passes into the heat exchanger and from the second orifice directly to atmosphere.

The invention further consists in adjusting the relative proportions of the orifices referred to in the preceding paragraph so that only the quantity of gas (at a higher temperature because it has not done work in the turbine) required to provide the necessary air temperature rise is supplied to the heat exchanger, the unwanted gas passing directly to atmosphere.

Further features of the invention will be apparent from the description given hereafter.

Referring to the accompanying diagrammatic drawings:

Figure 1 illustrate one convenient application of the present invention to a gas turbine installation;

Figure 2 shows the by-pass valve in alternative position;

Figure 3 illustrates a further application of the present invention to a modified gas turbine installation, and Figure 4 shows the valves in alternative positions. In carrying the invention into effect in one convenient manner illustrated in Figures 1 and 2 when applying the same to an installation having the simple cycle—compressor 1—combustion chamber 2—compressor turbine c comprising the gas generator line—separate output turbine e discharging to atmosphere, a change-over valve a is arranged between the exhaust pipe b of the compressor turbine c and the inlet d of the output turbine e.

The change-over valve a also controls the flow of gas to atmosphere through an orifice f in a pipe f', the arrangement being such that with the change-over valve in the position shown, the gas passes from the compressor turbine exhaust b through the output turbine e and then to atmosphere while in the position shown in Figure 2 the gas passes to atmosphere through the orifice f, the orifice being suitably proportioned to produce the same pressure drop as the turbine e so that there will then be no disturbance of the working conditions in the gas generator line when the valve is moved from one position to the other.

In applying the invention to a more complicated installation shown in Figures 3 and 4, in which the cycle is L. P. compressor 3—intercooler 4—H. P. compressor 5—heat exchanger k air side—primary combustion chamber 6—H. P. turbine driving compressors 7—reheat combustion chamber h—output turbine e—heat exchanger k gas side discharging to atmosphere, a system of change-over valves a' and a'' is fitted between the outlet pipe g of a reheat combustion chamber h and the inlet pipe d of the output turbine e so that the gas may either be passed through the output turbine or towards two orifices f and j in parallel, depending on the position of the valves a' and a'' which are coupled together. The two orifices f and j are so proportioned as together to produce the same pressure at the outlet g of the reheat combustion chamber h as would obtain with the gas passing through the turbine. The orifice f discharges to a heat exchanger k and the orifice j discharges direct to atmosphere and their relative proportions are such that the correct proportion of gas at the orifice discharge temperature is passed to the heat exchanger k to provide the same temperature rise on the air side of the heat exchanger as would obtain when the gas was passing through the output turbine e.

It will be appreciated that the means of control as above described allows for extremely rapid maneuvering from zero to full power and vice versa without significant temperature variation in the components when once the plant has been thoroughly heated up.

It will be understood that the foregoing details of construction are given by way of example to describe the invention and not to limit its scope and such details may be varied to suit any particular installation to which the invention is applied or any practical conditions that may have to be fulfilled.

I claim:

1. In a gas turbine installation comprising a combustion chamber, a compressor-driving turbine, a compressor driven thereby and a separate power output turbine, the outlet from which compressor-driving turbine is connected by a duct to the inlet of the output turbine, the combination with the said duct of a change-over valve in the duct, a further duct connected to said valve by-passing said output turbine and means in said further duct defining an orifice of predetermined cross-sectional area, whereby with the change-over valve in one position the gas flows through the output turbine in the normal manner while with the valve in the other position the gas is cut off from the output turbine and flows through said orifice so as to produce substantially the same pressure drop as that produced across the output turbine under the same conditions of mass flow and inlet temperature.

2. A gas turbine installation as claimed in claim 1, including also a heat exchanger between the compressor and combustion chamber, and between said further duct and output turbine and an outlet to atmosphere, and a second further duct open to atmosphere connected to said valve having means therein defining a further orifice of predetermined cross-sectional area.

3. A gas turbine installation as claimed in claim 2, wherein the relative proportions of the two orifices are selected so that only the quantity of gas required to provide substantially the same air temperature rise as is provided by the output turbine exhaust, when the output turbine is operating, is supplied to the heat exchanger, the unwanted gas passing directly to atmosphere.

4. A gas turbine installation as claimed in claim 2, wherein said duct connecting the outlet from the compressor-driving turbine to the inlet of the power output turbine includes a further combustion chamber.

References Cited in the file of this patent

UNITED STATES PATENTS

| | | |
|---|---|---|
| 1,123,860 | Doble | Jan. 5, 1915 |
| 2,568,662 | Sanborn | Sept. 18, 1951 |
| 2,587,649 | Pope | Mar. 4, 1952 |

FOREIGN PATENTS

| | | |
|---|---|---|
| 605,088 | Great Britain | July 15, 1948 |